(12) United States Patent
Brown (10) Patent No.: US 7,486,669 B2
(45) Date of Patent: Feb. 3, 2009

(54) METHOD FOR ACCESSING A MULTI-STAGE SWITCH FOR USE AS A SINGLE-STAGE SWITCH

(75) Inventor: Christopher Brown, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 712 days.

(21) Appl. No.: 10/858,035

(22) Filed: Jun. 1, 2004

(65) Prior Publication Data

US 2005/0078667 A1   Apr. 14, 2005

Related U.S. Application Data

(60) Provisional application No. 60/510,616, filed on Oct. 10, 2003.

(51) Int. Cl.
*H04L 12/50* (2006.01)

(52) U.S. Cl. .................. 370/388; 370/360; 370/357

(58) Field of Classification Search ............. 370/386, 370/388, 357, 360, 369, 387
See application file for complete search history.

(56) References Cited

U.S. PATENT DOCUMENTS

| | | | | |
|---|---|---|---|---|
| 5,451,936 A | * | 9/1995 | Yang et al. | 340/2.22 |
| 5,801,641 A | * | 9/1998 | Yang et al. | 340/2.22 |
| 2003/0021267 A1 | * | 1/2003 | Wu et al. | 370/388 |
| 2003/0214944 A1 | * | 11/2003 | Towles | 370/388 |
| 2004/0032866 A1 | * | 2/2004 | Konda | 370/388 |
| 2004/0114586 A1 | * | 6/2004 | Hong | 370/388 |
| 2005/0053061 A1 | * | 3/2005 | Konda | 370/388 |
| 2005/0117573 A1 | * | 6/2005 | Konda | 370/388 |
| 2006/0159078 A1 | * | 7/2006 | Konda | 370/386 |

* cited by examiner

*Primary Examiner*—Blane J Jackson
(74) *Attorney, Agent, or Firm*—Guerin & Rodriguez, LLP (57) ABSTRACT

A method and system for enabling a multi-stage switch to be adapted for single-stage switch applications. An interface manager manages the hardware interface for the multi-stage switch. The multi-stage switch includes input ports and output ports, and an input signal can be broadcast to one or more output ports. The interface manager limits the broadcasting of each input signal to avoid a blocking condition within the multi-stage switch which causes the blocking of one or more of the broadcast signals.

15 Claims, 7 Drawing Sheets

METHOD FOR ACCESSING A MULTI-STAGE SWITCH FOR USE AS A SINGLE-STAGE SWITCH

RELATED APPLICATION

This application claims the benefit of U.S. Provisional Patent Application Ser. No. 60/510,616, filed on Oct. 10, 2003, the entirety of which is incorporated herein by reference.

FIELD OF THE INVENTION

The invention relates generally to managing communications signals by single-stage or multi-stage switches. In particular, the invention relates to managing the features of a multi-stage switch.

BACKGROUND

Multi-stage and single-stage switches may be used in a communications network to manage communications signals, such as SONET (Synchronous Optical Network) based signals. Typically, the multi-stage switch is a time-space-time (TST) switch having three stages: an input time switch (input stage), a space switch stage (middle stage), and an output switch stage (output stage). Each time switch in the input time stage is coupled to multiple space switches. The space switches are coupled to the output time switches. The output of each space switch can be directed to a single port, or, alternatively, broadcast to any number of output ports.

In some instances, the configuration of switching paths between the input time switch stage and the space switch stage, and the space switch stage and the output time stage leads to a blocking situation. Thus blocking occurs, even though sufficient bandwidth is available, if the appropriate switching paths between the space stage and the time stages are not properly managed.

Device drivers can be developed to avoid blocking based on analyzing the complexities of the multi-stage switch, but this development can add significant design time and cost for associated products. Moreover, a single-stage switch may be preferred over a multi-stage switch for many applications; however, the bandwidth of the single-stage switch may not be sufficient to support some applications. For example, a higher bandwidth may be required to support various types of communications traffic. Thus, there is a need for an approach to adapt high bandwidth multi-stage switches for use as single-stage switches.

SUMMARY OF THE INVENTION

In one aspect, the invention features a network element having a multi-stage switch. The network element manages communications signals including an input signal and broadcast signals. The network element includes a multi-stage switch and an interface manager. The multi-stage switch includes a plurality of input ports and a plurality of output ports. The multi-stage switch receives the input signal at one of the input ports and provides the broadcast signals based on the input signal. A broadcast value indicates a number of output ports to receive the broadcast signals through the multi-stage switch. The interface manager is in communication with the multi-stage switch and manages a hardware interface for the multi-stage switch to enable the multi-stage switch to operate as a single stage switch. If the broadcast value exceeds a predetermined value, the interface manager limits the broadcast value to prevent blocking of one or more of the broadcast signals by the multi-stage switch.

In another aspect, the invention features a switch system having a multi-stage switch. The switch system includes a time-space-time switch and an interface manager. The time-space switch includes a plurality of input ports and a plurality of output ports. The time-space-time switch receives an input signal at one of the input ports and provides broadcast signals based on the input signal. A broadcast value indicates a number of output ports to receive the broadcast signals through the multi-stage switch. The interface manager is in communication with the time-space-time switch and manages a hardware interface for the time-space-time switch to enable the time-space-time switch to operate as a single stage switch. If the broadcast value exceeds a predetermined value, the interface manager limits the broadcast value to prevent blocking of one or more of the broadcast signals by the time-space-time switch.

In another aspect, the invention features a method for accessing a multi-stage switch. The method includes receiving a broadcast value indicating a number of broadcast signals based on an input signal provided by an input port, determining whether the broadcast value exceeds a predetermined value, and, if the broadcast value exceeds the predetermined value, limiting the broadcast value to prevent blocking of one or more of the broadcast signals by the multi-stage switch.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention relates to enabling a multi-stage switch to be adapted for single-stage switch applications. The method of the invention includes limiting the broadcast, or fanout, of each input signal to the multi-stage switch. In particular, the broadcast of a signal (e.g., a SONET STS-1 signal from an input port) to multiple output ports is not allowed to exceed a predetermined value (e.g., four). The predetermined value can be derived from a statistical model of possible switching paths through the multi-stage switch. As long as this broadcast limitation is observed, the multi-stage switch does not experience blocking and can be treated as a single-stage switch. Although the flexibility to use greater broadcast values is restricted, the performance parameters (e.g., bandwidth) of the multi-stage switch are unaffected.

Figure 1:
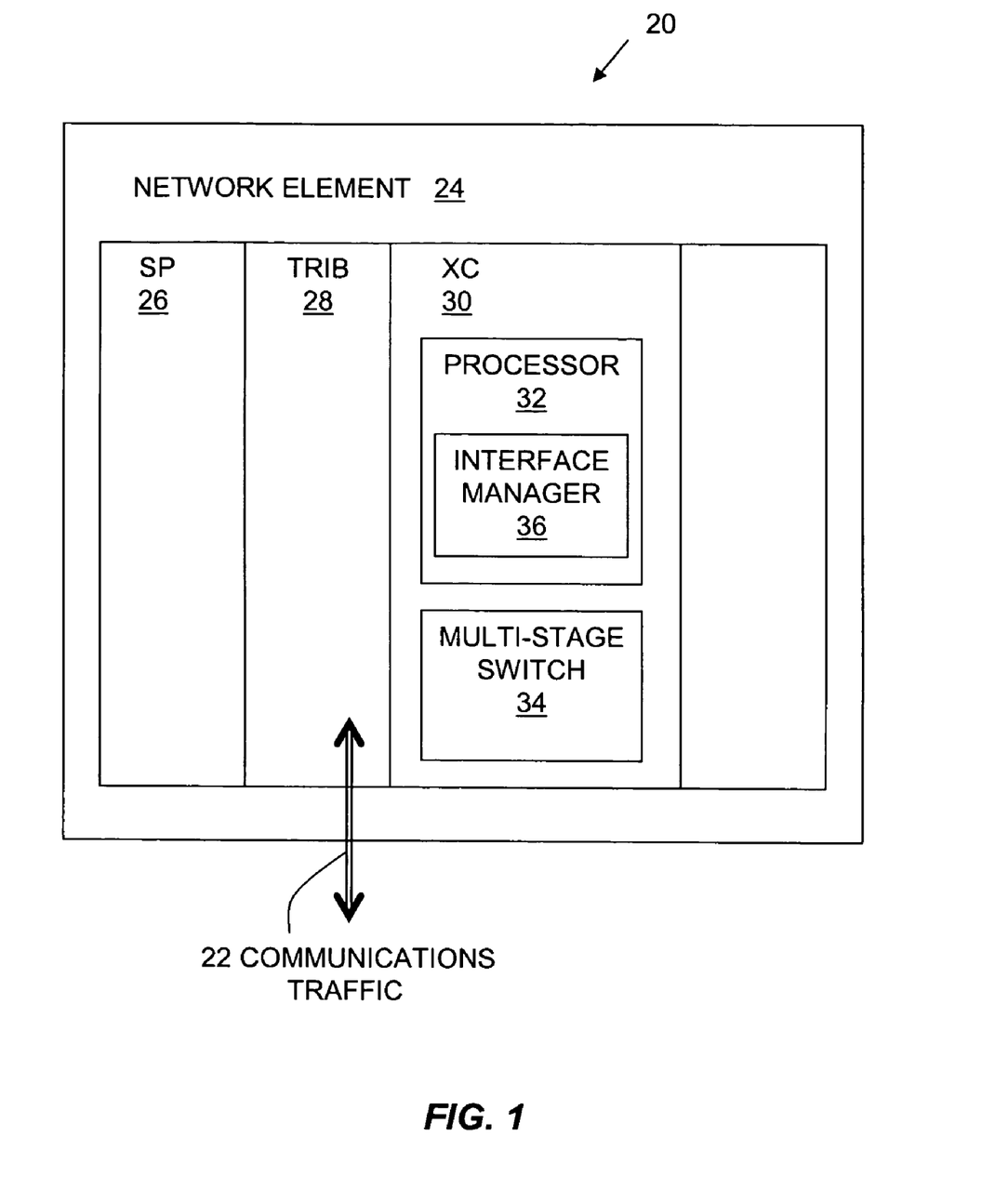
FIG. 1 is an illustration of a networked environment having a network element including an interface manager and multi-stage switch in accordance with the principles of the invention.

FIG. 1 depicts a networked environment 20 including a network element 24 that includes a multi-stage switch 34 and an interface manager 36 in accordance with the principles of the invention. The network element 24 includes a shelf processor (SP) module 26, one or more tributary (TRIB) modules 28, and one or more cross connect (XC) modules 30, although, alternatively, one or more of these modules 26, 28, 30 may be omitted. The network element 24 transmits and receives communications traffic 22 (e.g., SONET traffic) over a communications network (not shown).

The network element 24 is a device that manages the traffic 22 over the communications network, such as a network switch device and/or gateway network device. The network element 24 is a switch that coordinates multiplexed optical communications traffic, such as SONET STS (synchronous transport signal level) based communications traffic 22 (e.g., STS-48 communications signals). Alternatively, the network element 24 is capable of coordinating other types of communications traffic 22, such as SDH (Synchronous Digital Hierarchy) based signals. In various embodiments of the invention, the network element 24 is any suitable type of computing device, such as a network device, PC (personal computer), desktop computer, workstation, server, or other computing device configured to provide switching, gateway, and/or other network traffic management functions.

The shelf processor module 26 is a processor board, such as a printed-circuit board including a microprocessor and memory. The shelf processor 26 manages various operations of a network element 24. One or more tributary modules 28 (i.e., port cards) are computer components or printed-circuit boards that operate in conjunction with the shelf processor 26 and one or more cross-connect modules to receive input for and provide output for the communications traffic 22. The cross-connect modules 30 are computer components or printed-circuit boards that operate in conjunction with the shelf processor 26 to provide links or coordination between components, such as tributary modules 28, within the network element 24.

The cross-connect module 30 includes one or more microprocessors 32, and a multi-stage switch 34. The cross-connect module 30 typically also includes a volatile memory (e.g., RAM or random access memory) and/or nonvolatile memory (e.g., nonvolatile hard disk or integrated circuit (IC) memory chip) for storing the instructions of the interface manager 36 that are hosted and executed by one or more microprocessors 32 of the cross-connect module 30. The instructions configure the one or more microprocessors 32 to perform the functions of the interface manager 36, as described herein, to manage the multi-stage switch 34. The instructions for the interface manager 36 are implemented in C and C++ code. The interface manager 36 can also be implemented in object code, machine code, or other compiled computer source code, such as C#, Pascal, or Java. Alternatively, the interface module or interface manager 36 is implemented as one or more hardware modules or integrated circuit (IC) devices, such as ASIC (application specific IC) or PGA (programmable gate array) devices. In another alternative, the interface manager 36 is implemented as a component of or circuitry that is part of the multi-stage switch 34. In other embodiments, the multi-stage switch 34 and the interface manager 36 are implemented on devices or components of the network element 24 other than the cross-connect module 30.

Figure 2:
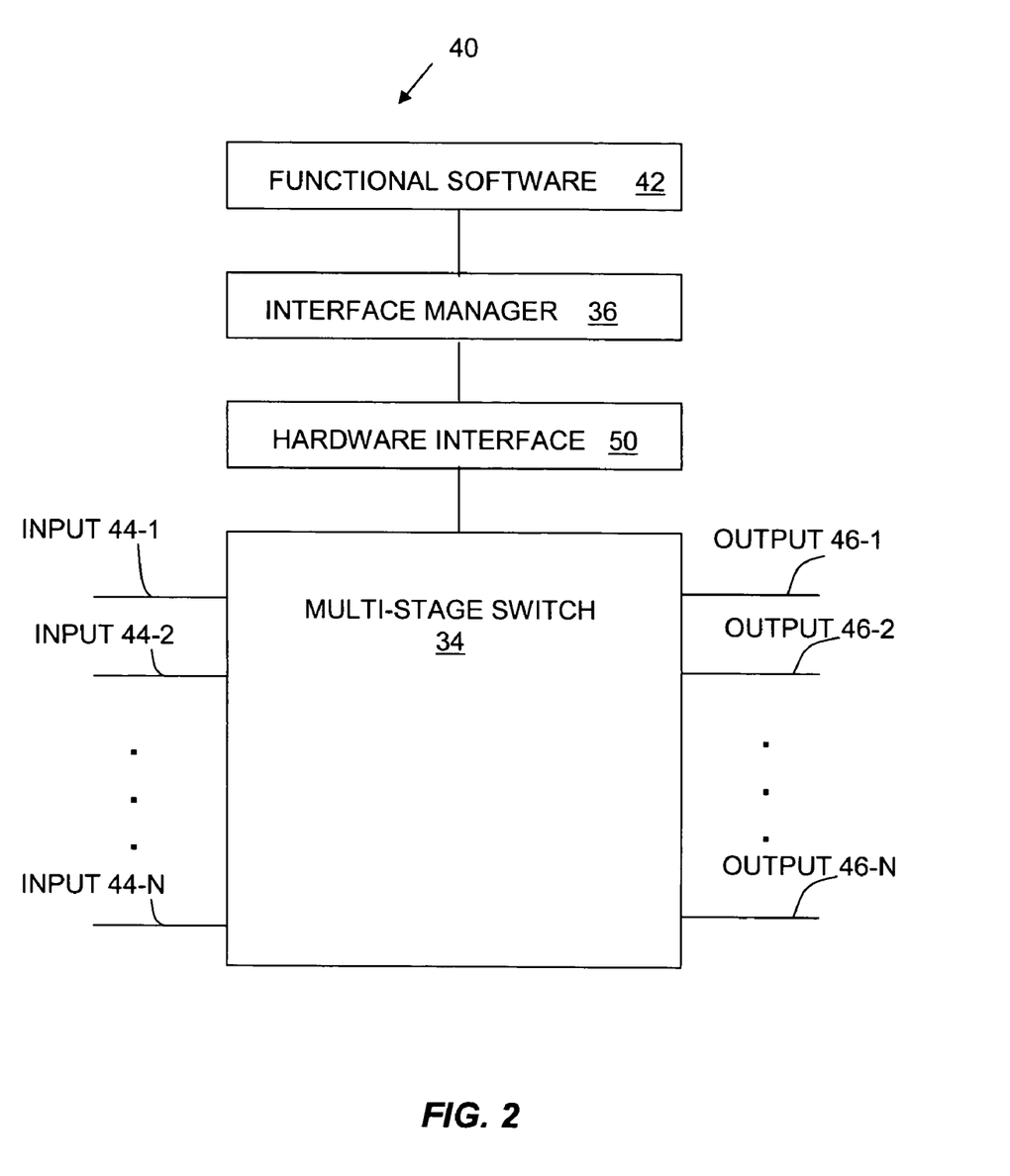
FIG. 2 is a block diagram of a switch environment including a multi-stage switch, a hardware interface, an interface manager, and functional software in accordance with the principles of the invention.

FIG. 2 is a functional block diagram of a switch environment 40 including a multi-stage switch 34, a hardware interface 50, an interface manager 36, and functional software 42, in accordance with the principles of the invention. The multi-stage switch 34 includes input ports 44-1 through 44-N (referred to collectively as "input ports 44"), and output ports 46-1 through 46-N (referred to collectively as "output ports 46").

The hardware interface 50 provides a layer of software functionality that is associated with the hardware of the multi-stage switch 34. The instructions of the hardware interface 50 software execute on and configure the processor 32 to perform the functions of the hardware interface 50 as described herein. The hardware interface 50 for the multi-stage switch 34 provides an interface for setting parameters for the switch 34 and for programming optional or programmable features of the switch 34. Instead of upper layer software, such as the interface manager 36, directly accessing specific memory locations within the multi-stage switch 34, the hardware interface 50 provides basic functionality that simplifies usage of the switch 34. The features provided by the hardware interface 50 are typically based around the device functionality of the multi-stage switch 34. For example, assume that the interface manager 36 can query the value of an overhead byte X being received on an input port A, in channel B of the switch 34. To obtain this information, the value, the correct register to write to within the switch 34 and how the bits within the register are set is determined. Also, the result is extracted from an associated read register within the switch 34. The hardware interface 50 provides the functionality to translate A, B and X into the appropriate register locations and register values within the switch 34. Thus, with the hardware interface 50, the interface manager 36 can call a function, such as Incoming Byte=RetrieveByte (*A,B,X*)

where RetrieveByte is a function provided by the hardware interface 50. Using the hardware interface 50, the interface manager 36 is not required to provide actual register locations and register values for registers within the switch 34 when enabling, disabling, and configuring features of the switch 34 (see description for FIGS. 6 and 7 below).

The input ports 44 receive SONET-based signals, and the output ports 46 provide SONET-based output signals. As illustrated, the number of inputs ports 44 is the same as the number of output ports 46. Alternatively, the number of input ports 44 is not required to be the same as the number of output ports 46. The tributary module 28 receives optical SONET-based signals (e.g., through an optical fiber cable), which are transferred to a wire or printed-circuit board connection for coupling to the input ports 44 of the multi-stage switch 34. The signals are routed through the multi-stage switch 34 to the output ports 46, provided to a wire or printed-circuit board connection, and to a tributary module 28 as optical SONET-based signals.

The software module (e.g., interface manager 36) used to enforce the broadcast limitation effectively encapsulates the multi-stage switch 34. This allows software 42 developed for single-stage switches to be used with multi-stage switches 34 having the interface manager 36 according to the principles of the invention. Examples of the functions implemented by such software 42 in a communications shelf (e.g., network element 24) include bandwidth management, user interfaces, and TL-1 commands (i.e., network management messages and commands) for provisioning and controlling cross-connect functionality.

In one embodiment, the multi-stage switch 34 is a hardwire device on a cross-connect card 30 in a network element 24 (e.g., communications shelf). The instructions for the software (e.g., interface manager 36 and hardware interface 50) associated with the multi-stage switch 34 are executed on a processor 32 on the cross-connect card 30. The software (i.e., 36) is effectively a hardware interface manager that manages the differences between what appears to be a single-stage switch to the external software 42 and the actual multi-stage switch 34 on the cross-connect card 30 to enable the multi-stage switch 34 to operate as a single stage switch. Thus the differences are transparent to other software modules 42 running on the cross-connect module 30 and the communications shelf processor module 26. In another embodiment, the instructions (e.g., software code) for both the interface manager 36 and the hardware interface 50 are combined in the same module, which can be implemented in software (e.g., code) and/or hardware (e.g., IC chip). For more information on the interface manager 36 and the hardware interface 50, see FIGS. 6 and 7.

Figure 3:
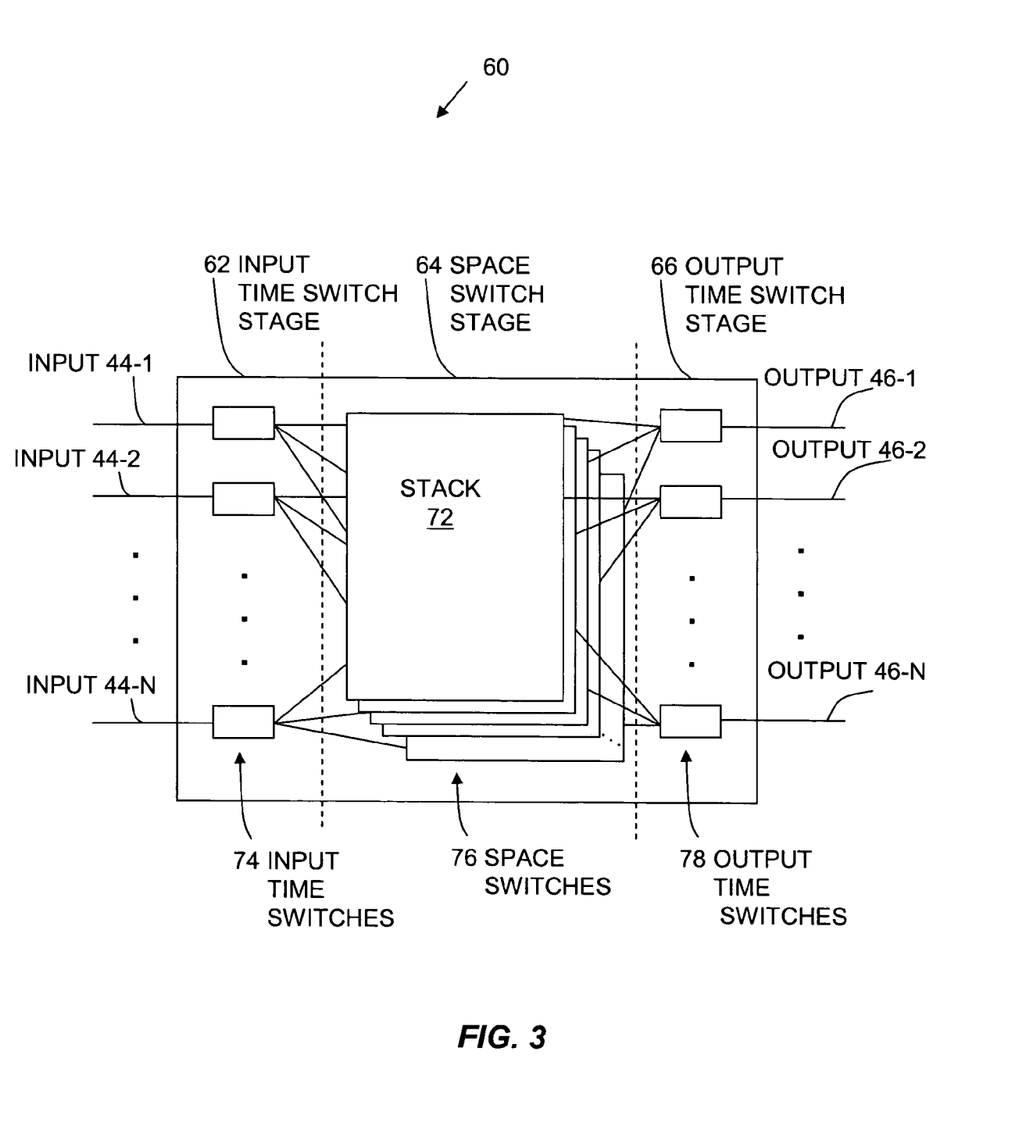
FIG. 3 is a schematic diagram of a time-space-time switch in accordance with the principles of the invention.

FIG. 3 is a schematic diagram of a multi-stage switch configured as a time-space-time (TST) switch 60 in accordance with the principles of the invention. The TST switch 60 is equivalent to the multi-stage switch 34. The TST switch 60 can be coupled with the interface manager 36 to form a switch system.

The TST switch 60 provides a TST configuration for switching signals provided at each of N input ports 44-1 through 44-N to one or more of N possible output ports 46-1 through 46-N. Each input port 44 receives a SONET-based signal such as an STS-48 having 48 STS-1 signals. The TST switch 60 is represented by three stages: the input time switch stage (input stage) 62, the space switch stage (middle stage) 64 and the output time switch stage (output stage) 66. The space switch section 64 is depicted with multiple space switches 76 shown as a stack 72. Each input time switch 74 in the input time switch stage 62 is coupled to multiple space switches 76. The space switches 76 are coupled to the output time switches 78. Each STS-1 signal at an input port 44 is switched to a single space switch 76 or broadcast to any number of space switches 76. The output of each space switch 76 can be directed to a single output port 46 or, alternatively, broadcast to any number of output ports 46. The number of input ports 44 is typically equal to the number of output ports 46.

As used herein, an "input signal" from an input port 44 indicates the whole signal that is received by an input port 44 (e.g., STS-48) or one channel of the signal (e.g., one or more STS-1 signals that are part of an STS-48 signal). Typically, the input time switch 74 for an input port 44 separates the various channels (e.g., STS-1 signals) from a multiplexed signal (e.g., an STS-48 signal) provided as input to the input port 44 to provide one or more input signals to the space switch stage 64 of the TST switch 60. Also, as used herein, a "broadcast signal" received at an output port 46 through the TST switch 60 indicates the whole signal from the input port 44 (e.g., STS-48 signal) or one or more channels from the whole signal (e.g., one or more STS-1 signals that are part of an STS-48 signal). Typically, the output time switch 78 for an output port 46 combines various channels (e.g., STS-1 signals) received through the space switch stage 64 of the TST switch 60 into a multiplexed signal (e.g., an STS-48 signal) provided as output from the output port 46.

For example, each input port 44 receives an STS-48 input stream, which each input time switch 74 can separate into 48 STS-1 signals and which can be individually routed to various output time switches 78 through the space switches 76. Each output time switch 78 can combine the STS-1 signals from multiple input time switches 74 to provide an STS-48 output stream. Thus, the TST switch 60 directs each STS-1 component of each input stream to an arbitrary STS-1 slot in an arbitrary output stream. This approach provides an "STS-1" granularity. For example, a TST switch 60 having 72 input ports 44 and 72 output ports 46 (i.e., a 72×72 switch configuration) provides, in effect, a 3456×3456 STS-1 switch configuration. Alternatively, the TST switch 60 is not limited to an STS-1 granularity, but can be based on a larger or smaller unit of granularity.

Blocking can occur in the TST switch 60 when an input (e.g., STS-1) signal (e.g., from an input time switch 74) cannot be routed to an output (e.g. available time slot at an output time switch 78), even though there is sufficient bandwidth available in the space switch stage 64. That is, there is an available or idle output, but the TST switch 60 cannot find a connection to the available output for the input signal. Typically, the connection cannot be made because there are two levels of interconnects in the TST switch 60 in the configuration of switching paths between (i) the input time switch stage 62 and the space switch stage 64, and between (ii) the space switch stage 64 and the output time switch stage 66.

Figure 4:
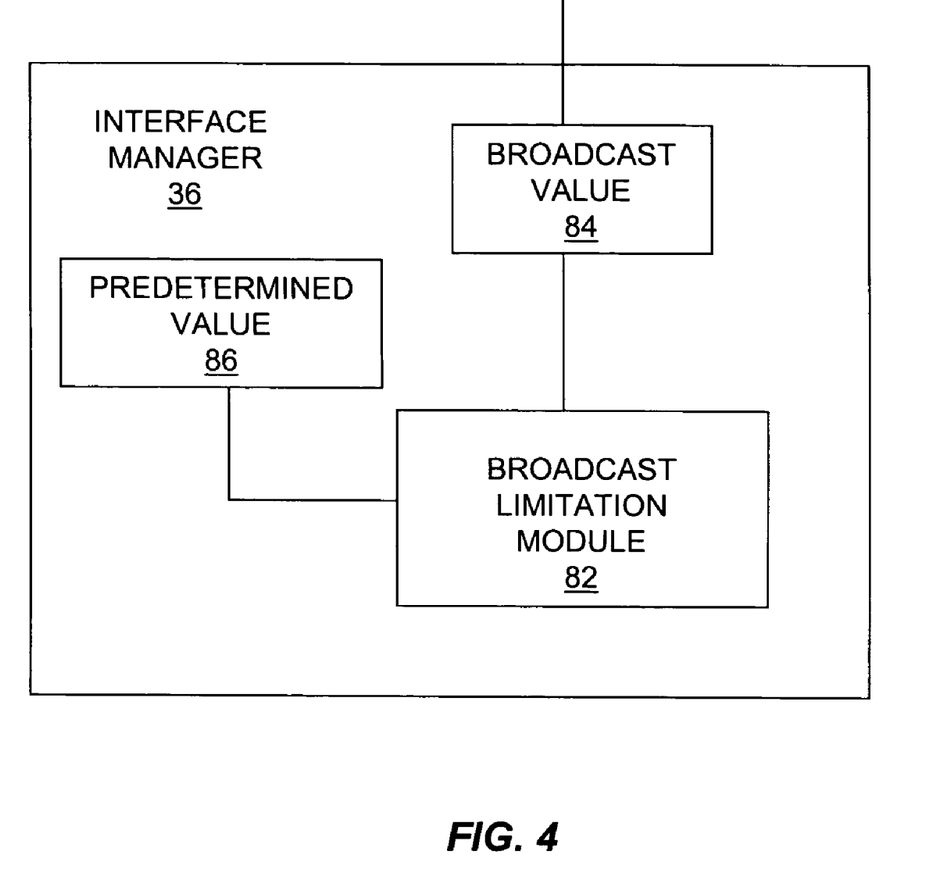
FIG. 4 is a functional block diagram of an interface manager including a broadcast limitation module in accordance with the principles of the invention.

FIG. 4 is a functional block diagram of an interface manager 36 in accordance with the principles of the invention. The interface manager 36 includes a broadcast limitation module 82, and data values indicated by a broadcast value 84 and a predetermined value 86. The data values 84, 86 are retained in a memory, such as a cache or RAM (random access memory), accessible to the interface manager 36. If the interface manager 36 is implemented as a software or hardware component of a cross-connect module 30, the data values 84, 86 can be stored in a memory or cache included as part of the cross-connect module 30. Alternatively, the interface manager 36 accesses the data values 84, 86 from a data storage (e.g., nonvolatile memory or hard disk) or volatile memory (not shown) located in the network element 24 or associated with the network element 24.

The broadcast limitation module 82 functions to limit the broadcast of an input signal to output ports 46 of the multi-stage switch 34 (e.g., TST switch 60). The cross-connect module 30 typically also includes a volatile memory and/or nonvolatile memory for storing the instructions of the broadcast limitation module 82 that are hosted and executed by the one or more microprocessors 32 of the cross-connect module 30. The instructions configure the one or more microprocessors 32 to perform the functions of the broadcast limitation module 82, as described herein. Alternatively, the broadcast limitation module 82 is implemented as either software instructions or in hardware. In another embodiment, the broadcast limitation module 82 and other modules or components of the interface manager 36 are implemented partly in hardware and partly in software.

The predetermined value 86 indicates the number of broadcast signals that can be broadcast to output ports 46 without causing a blocking condition in the multi-stage switch 34 (e.g., TST switch 60). The predetermined value 86 can be derived from a statistical model of possible switching paths through the multi-stage switch 34. For example, each possible switching path is a path in a TST switch 60 from an input port 44 through an input time switch 74 through a space switch 76 through an output time switch 78 to an output port 46. In one embodiment, the predetermined value 86 is four which is suitable, for example, for a 72×72 TST switch 60. TST switches 60 that have a 72×72 configuration are not limited to or required to have a predetermined value 86 of four. Different implementations of a 72×72 TST switch 60 can have other predetermined values 86.

The predetermined value 86 can be determined by performing a simulation of the multi-stage switch 34. Different instances of the simulation are run based on different values for the number of broadcast signals allowed for each input signal, such as broadcast values of 2, 3, 4, 5, and so on. A successful event is the connection of an input signal to the number of output ports 46 indicated by the designated broadcast value for that input signal. A failure occurs when an available or idle output port 46 cannot be reached due to a blocking condition in the multi-stage switch 34. In this manner, the probability of a blocking condition can be determined. For example, take an STS-1 input signal for each input port 44 and allow a broadcast to 2 output ports (1 to 2), then with increasing complexity of 1 to 3, 1 to 4, and so on. For each simulation, connections are allowed until all output ports 46 are connected. For each simulation, the number of successful events and the number of failures are recorded. After running multiple simulations, a probability of a successful non-blocking connection can be determined for each broadcast value 84 for a given multi-state switch 34. A successful non-blocking condition can be defined as a probability that is less than 100%, which may be acceptable for certain applications. For example, a 99.998% probability of a non-blocking condition for a broadcast value of 4 (four) can be acceptable for many applications.

Figure 5:
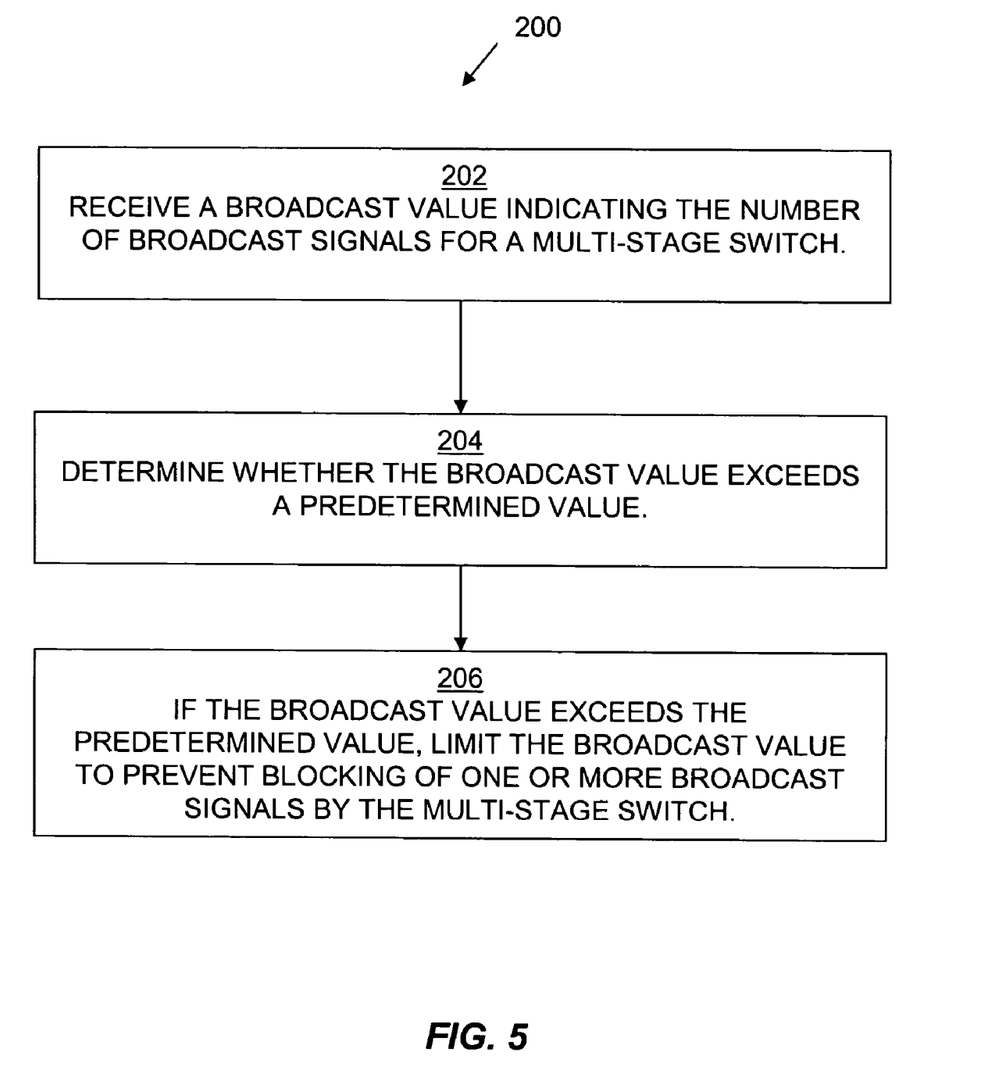
FIG. 5 is a flow diagram of a procedure for accessing a multi-stage switch for use as a single-stage switch in accordance with the principles of the invention.

FIG. 5 is a flow diagram of an embodiment of a procedure 200 for accessing a multi-stage switch 34 for use as a single-stage switch in accordance with the principles of the invention. The procedure 200 is suitable for use with the multi-stage switch 34. The interface manager 36 is in communication with the multi-stage switch 34 and receives (step 202) a broadcast value 84 indicating a number of output ports 46 to receive, through the multi-stage switch 34, broadcast signals based on an input signal provided by an input port 44. For example, the interface manager 36 receives a request for routing communication traffic through the multi-stage switch 34. The connection request can originate from the user (manual provisioning of a new connection) or from the system (i.e., network element 24) in response to a protection request due to a connection failure. The request provides one or more broadcast values 84. The interface manager 36 can determine a broadcast value 84 by counting the number of output ports 46 indicated for broadcasts for an input signal. Alternatively, the interface manager 36 receives a new request to provide more broadcasts for one or more input signals for a multi-stage switch 34 that is already (fully or partially) configured. For example, an input signal is already broadcast to one or more output ports 46, and the new request increases the number of broadcasts for that specific input signal. The interface manager 36 evaluates the configuration of the multi-stage switch 34 to determine the broadcast value 84 for the specific input signal to be associated with the new request.

The interface manager 36 (e.g., the broadcast limitation module 82) compares (step 204) the broadcast value 84 to a predetermined value 86 to determine whether the broadcast value 84 exceeds the predetermined value 86. The predetermined value 86 is one that is preset in the interface manager 36 as a hard coded value that is fixed for general use. The interface manager 36 may allow a single instance of a broadcast value 84 greater than the predetermined value 86 (e.g., four) for certain specific applications. Allowing a single connection with a broadcast value 84 greater than the predetermined value 86 does not adversely affect the blocking probability. This exception for a single connection is typically limited. For example, if the predetermined value 86 is four, then the allowed broadcast is typically limited to only five or six destinations.

If the broadcast value 84 exceeds the predetermined value 86, the broadcast limitation module 82 limits (step 206) the broadcast value 84 to prevent blocking of one or more of the broadcast signals by the multi-stage switch 34. The broadcast limitation module 82 rejects the connection request that provided or indicated the inappropriate broadcast value 84 (except for certain specific applications and situations, as described herein). The broadcast limitation module 82 treats the rejection as a software error and logs it in an error log, and sends an error message back to the user. In exceptional situations, the software (e.g., functional software 42) can generate a scenario which implements a single instance of a broadcast greater than four due to various user requests that are not directly related to provisioning a connection. For example, users are allowed to move existing connections to different channels, which may require a transitory state in which a given source has five destinations. In this case, the user enters a "move" command for the connection, but the user is not aware of the exception to the broadcast limitation occurring because the interface manager 36 handles this exception.

Figure 6:
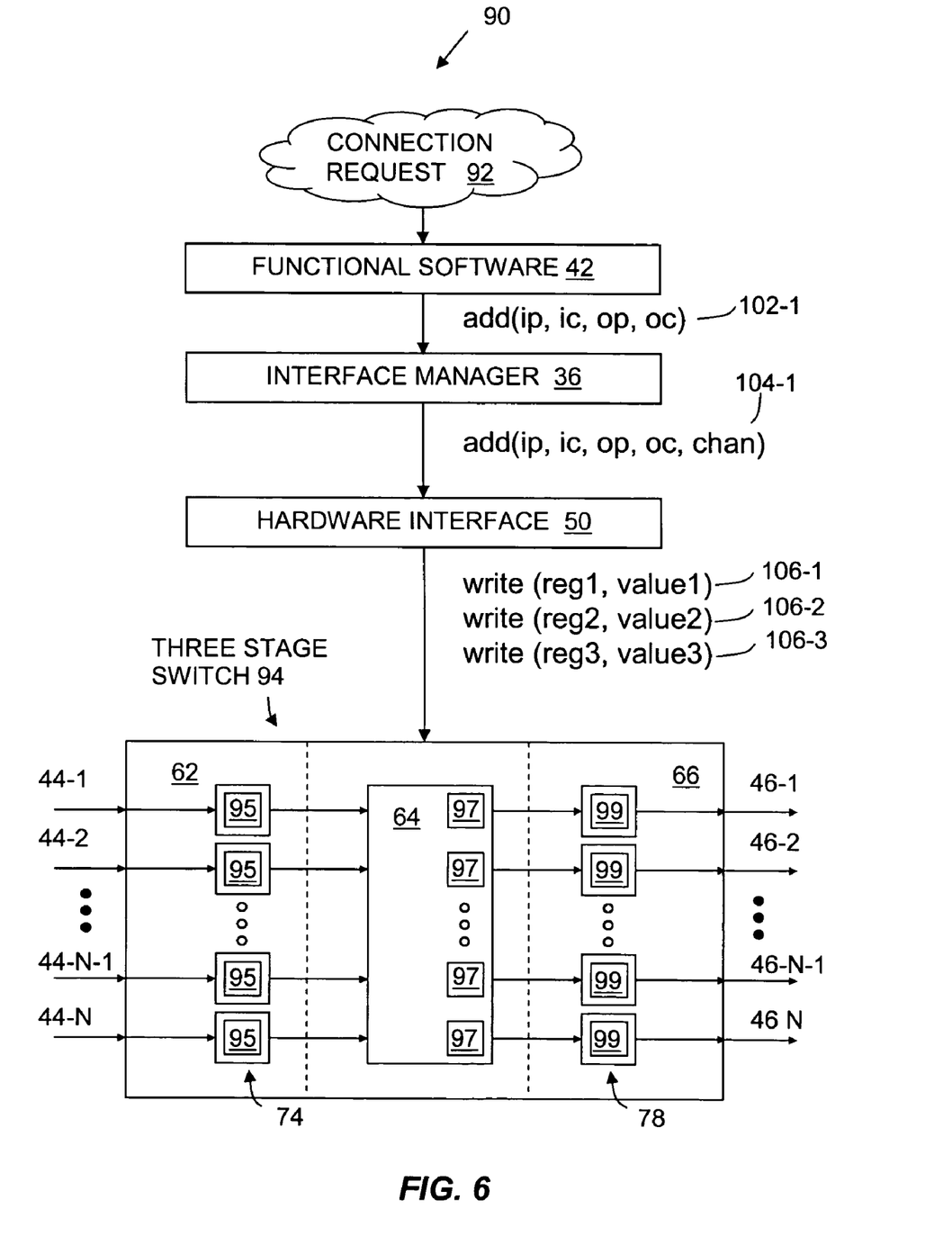
FIG. 6 is a block diagram of a switch environment, illustrating the establishment of a new connection based on a connection request, in accordance with the principles of the invention.

FIG. 6 is a block diagram of a switch environment 90, illustrating the establishment of a new connection based on a connection request 92, in accordance with the principles of the invention. The switch environment includes functional software 42, the interface manager 36, the hardware interface 50, and three stage switch 94. The three stage switch 94 includes a first stage 62 with input time switches 74, a center stage 64 for space switching, and a third stage 66 with output time switches 78. The three stage switch 94 is equivalent to the multi-stage switch 34.

Each input time switch 74 includes one set of input registers or input register set 95. Each input port 44 of the three stage switch 94 has one dedicated time switch 74 and an input register set 95 associated with that input port 44. By programming one register of one input register set 95, the interface manager 36 (using the hardware interface 50) can make a connection between one channel at an input port 44 and one of the output channels from one time switch 74 to the center stage 64.

The center stage 64 includes output ports (output to the output time switches 78) with one set of registers or center stage register set 97 associated with each output port of the center stage 64. The center stage 64 allows for the basic connection of input channels from the different input ports of the center stage 64 to output channels on the output ports of the center stage 64. By programming one register of one center stage register set 97, the interface manager 36 (using the hardware interface 50) can make a connection between an input port of the center stage 64 and an output port of the center stage 64. Alternatively, other configurations for the center stage 64 can be used instead of the one large switch shown in FIG. 6. For example, the center stage 64 can be depicted as up to N smaller switches with the output of each switch 74 in the first stage 62 connected to each of the smaller switches (see also FIG. 3).

The interface manager 36 generally performs channel allocation and management functions for channels through the center stage 64. For example, the interface manger 36 allocates and deallocates channels through the center stage 64 to connect the first stage 62 and third stage 66 together. As the interface manager 36 provisions and deprovisions connections, the available channels through the center stage 64 can become fragmented. The interface manager 36 monitors this fragmentation and occasionally performs consolidation of the channels to avoid excessive fragmentation.

Each output time switch 78 includes one set of output registers or output register set 99. Each output port 46 of the three stage switch 94 has a dedicated time switch 78 and one output register set 99 associated with that output port 46. The output time switch 78 allows the incoming channels from the center stage 64 to be rearranged prior to being transmitted on the output port 46 associated with that output time switch 78. This rearrangement provides flexibility in allocating channels through the center stage 64. By programming a register from the register set 99, the interface manager 36 (using the hardware interface 50) can make a connection between an input channel input to the output time switch 78 from the center stage 64 and an output channel transmitted from the output time switch 78 on the associated output port 46. Alternatively, each output time switch 78 in the third stage 66 has an output register set 99 based on the number of channels that are received from the output of the center stage 64.

The connection request 92 is intended to establish a communication connection through the three stage switch 94. This request can originate from any number of sources, such as a user (e.g., network administrator), or the request can be automatically generated. For example, a user can manually provision a new connection. In another example, software in the network element 24 generates the connection request 92 in response to a protection request due to a connection failure.

In an overview of the process illustrated in FIG. 6, the functional software 42 receives the new connection request 92. The functional software 42 verifies the connection request 92, determines which input port and input channel (ip, ic) and which output port and output channel (op, oc) are associated with the requested connection. In this example the input (ip, ic) is connected to output (op, oc). The functional software 42 provides a connection command 102-1 to add this connection, as indicated by add(ip, ic, op, oc)

The interface manager 36 receives the connection command 102-1. The interface manager 36 presents an interface to the functional software 42 which functions like a single stage switch. The interface manager 36 allocates an available channel (chan) through the center stage 64 and configures the three stage switch 94 via the hardware interface 50. The interface manager 36 provides a modified connection command 104-1, as indicated by add(ip, ic, op, oc, chan)

The hardware interface 50 determines which registers (memory location within the three stage switch 94) and what register values are required to configure the switch 94. The hardware interface 50 provides register instructions 106-1, 106-2, and 106-3 based on the modified connection command 104-1, as indicated by write (reg1, value1)
write (reg2, value2)
write (reg3, value3)

In the register instruction 106-1, reg1 indicates a register in the input register set 95 in an input time switch 74, and value1 indicates what value is required to configure the reg1 register for the connection request 92. In the register instruction 106-2, reg2 indicates one register in the center stage register set 97, and value2 indicates what value is required to configure the reg2 register for the connection request 92. In the register instruction 106-3, reg3 indicates a register in the output register set 99 in an output time switch 78, and value3 indicates what value is required to configure the reg3 register for the connection request 92.

Figure 7:
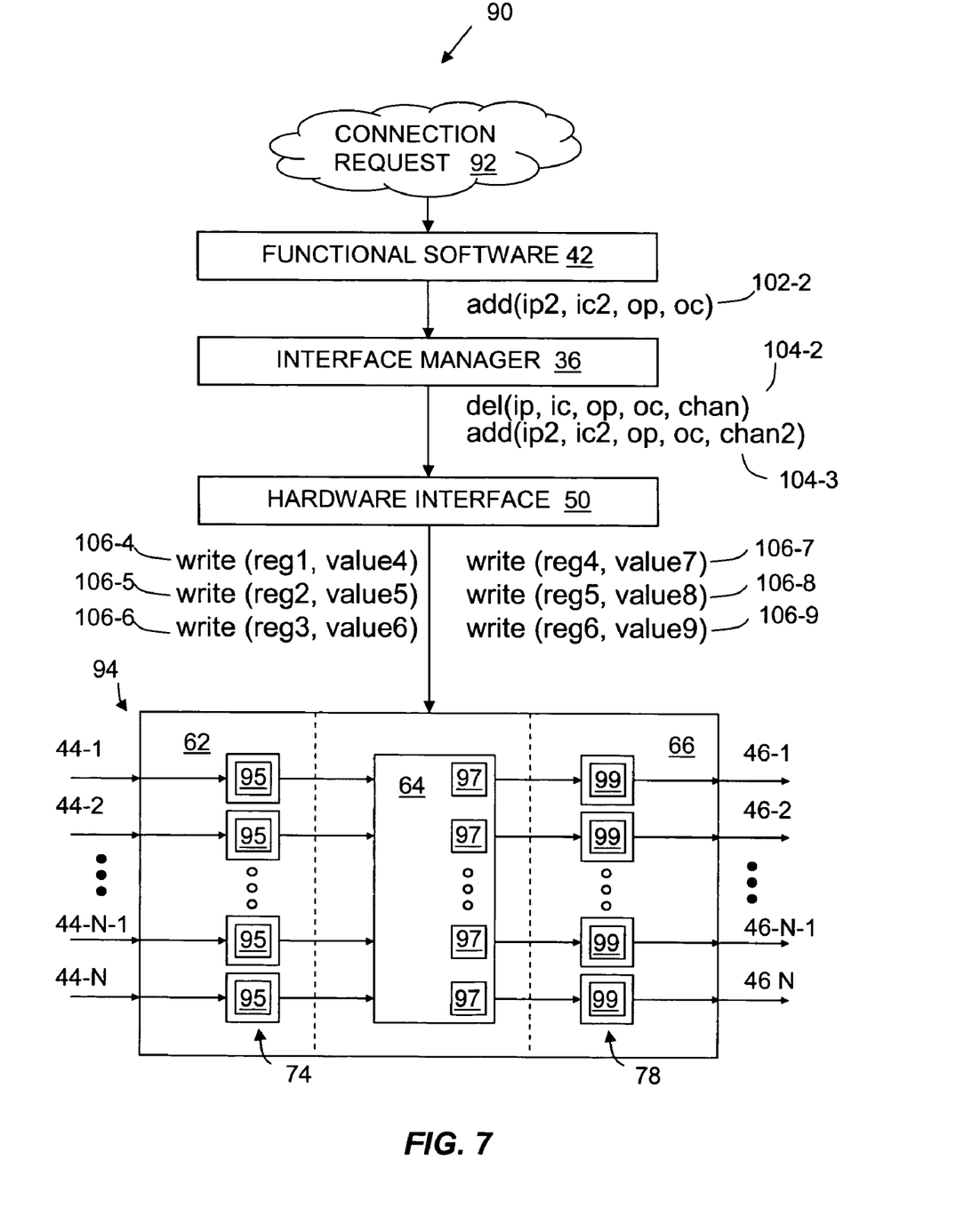
FIG. 7 is a block diagram of the switch environment of FIG. 6, illustrating the establishment of a modification to an existing connection in accordance with the principles of the invention.

FIG. 7 is a block diagram of the switch environment 90 of FIG. 6, illustrating a modification to an existing connection. To modify the existing connection, the old connection is deleted. To add the new connection, an available channel through the center stage 64 is allocated, and the required channel shuffling in the first stage 62 and the third stage 66 determined.

The functional software 42 receives a new connection request 92, which modifies an existing connection. The functional software 42 verifies the connection request 92, determines which input port and input channel (ip2, ic2) and which output port and output channel (op, oc) are associated with the new connection. In this example the input (ip2, ic2) is connected to output (oc, op) for the new connection. The functional software 42 provides a connection command 102-2 to add this connection, as indicated by add(ip2, ic2, op, oc)

Unlike a single stage switch which directly overwrites the existing connection, the three stage switch 94 deletes the existing connection before adding the new modified connection. The functional software 42 provides only a connection command (e.g., 102-2) which does not provide for deleting the existing connection.

The interface manager 36 fulfills the requirement that the existing connection be deleted prior to the new connection being added. The interface manager 36 allocates an available channel (chan2) through the center stage 64 and configures the switch 94 via the hardware interface 50. The channel (chan2) may be the same as or different from the existing channel (chan). The interface manager 36 provides for overwriting the existing connection by first deleting the existing connection, and then adding the new connection, as indicated by the modified connection commands 104-2 and 104-3 del(ip, ic, op, oc, chan)
add(ip2, ic2, op, oc, chan2)

The hardware interface 50 determines which registers and what register values are used to configure the switch 94 to overwrite the existing connection and provide for the requested new connection. The hardware interface 50 provides register instructions 106-4, 106-5, 106-6, 106-7, 106-8, and 106-9 based on the modified connection commands 104-2 and 104-3. Register instructions 106-4, 106-5 and 106-6 delete the existing connection, as indicated by write (reg1, value4)
write (reg2, value5)
write (reg3, value6)

The register values (value4, value5, and value 6) are appropriate for deleting the previously existing connection configured in the registers (reg1, reg2, reg3).

The register instructions 106-7, 106-8, and 106-9 add the new connection, as indicated by write (reg4, value7)
write (reg5, value8)
write (reg6 value9)

The registers (reg4, reg5, and reg6) indicates the registers to be used for the new connection with appropriate configuration values (value7, value8, and value9). The registers (reg4, reg5, and reg6) may or may not be the same as the registers (reg1, reg2, and reg3) used in the existing connection.

Alternatively to the one connection command 102-1 and 102-2 generated for each connection request 92 as shown in FIGS. 6 and 7, the functional software 42 may generate more than one command for one connection request 92.

While the invention has been shown and described with reference to specific preferred embodiments, it should be understood by those skilled in the art that various changes in form and detail may be made therein without departing from the spirit and scope of the invention as defined by the following claims.

What is claimed is:

1. A network element having a multi-stage switch, the network element managing communications signals comprising an input signal and broadcast signals, the network element comprising:
   a multi-stage switch comprising a plurality of input ports and a plurality of output ports, the multi-stage switch receiving the input signal at one of the input ports and providing the broadcast signals based on the input signal, a broadcast value indicating a number of output ports to receive the broadcast signals through the multi-stage switch; and
   an interface manager in communication with the multi-stage switch and managing a hardware interface for the multi-stage switch to enable the multi-stage switch to operate as a single stage switch, wherein the interface manager, if the broadcast value exceeds a predetermined value, limits the broadcast value to prevent blocking of at least one of the broadcast signals by the multi-stage switch.

2. The network element of claim 1, wherein, if the broadcast value exceeds the predetermined value, the interface manager rejects a request, based on the broadcast value, for broadcast of the input signal from the multi-stage switch.

3. The network element of claim 1, wherein the multi-stage switch is a time-space-time switch, and the input signal is a time division multiplexed signal.

4. The network element of claim 1, wherein the interface manager modifies at least one connection command to overwrite an existing connection in the multi-stage switch.

5. The network element of claim 1, wherein the network element comprises a cross-connect module comprising the multi-stage switch and interface manager.

6. The network element of claim 1, wherein the predetermined value is 4 (four).

7. A switch system having a multi-stage switch, the switch system comprising:
   a time-space-time switch comprising a plurality of input ports and a plurality of output ports, the time-space-time switch receiving an input signal at one of the input ports and providing broadcast signals based on the input signal, a broadcast value indicating a number of output ports to receive the broadcast signals through the multi-stage switch; and
   an interface manager in communication with the time-space-time switch and managing a hardware interface for the time-space-time switch to enable the time-space-time switch to operate as a single stage switch, wherein the interface manager, if the broadcast value exceeds a predetermined value, limits the broadcast value to prevent blocking of at least one of the broadcast signals by the time-space-time switch.

8. The switch system of claim 7, wherein, if the broadcast value exceeds the predetermined value, the interface manager rejects a request, based on the broadcast value, for broadcast of the input signal from the time-space-time switch.

9. The switch system of claim 7, wherein the interface manager modifies at least one connection command to overwrite an existing connection in the multi-stage switch.

10. The switch system of claim 7, wherein the input signal is based on a time division multiplexed signal.

11. The switch system of claim 7, wherein the predetermined value is 4 (four).

12. A method for accessing a multi-stage switch, the method comprising:
    receiving a broadcast value indicating a number of broadcast signals based on an input signal provided by an input port;
    determining whether the broadcast value exceeds a predetermined value; and
    if the broadcast value exceeds the predetermined value, limiting the broadcast value to prevent blocking of at least one of the broadcast signals by the multi-stage switch.

13. The method of claim 12, wherein the limiting the broadcast value comprises rejecting a request, based on the broadcast value, for connections through the multi-stage switch.

14. The method of claim 12, further comprising modifying at least one connection command to overwrite an existing connection in the multi-stage switch.

15. The method of claim 12, wherein the predetermined value is 4 (four).

* * * * *